Patented Apr. 2, 1935

1,996,100

UNITED STATES PATENT OFFICE 1,996,100

INSECTICIDE AND FUNGICIDE AND METHOD OF PREPARING SAME

Elmer R. de Ong, Berkeley, Calif., and Eugene B. Smith, Jacksonville, Fla., assignors to E. W. Colledge, General Sales Agents, Inc., Jacksonville, Fla., a corporation of Florida No Drawing. Application December 28, 1929, Serial No. 417,251

4 Claims. (Cl. 167—25)

This invention relates to insecticides and fungicides and to materials that may be combined and used for such purposes with good toxic results, or which may be combined with other materials heretofore used for insecticidal or fungicidal purposes, to regulate the toxic effect thereof.

The material to which reference is first made is oil extracted from wood, which may be extracted by destructive or steam distillation, or by means of solvents, or by a combination of such methods, and while such oil may be obtained from various woods, particular reference is made to that obtained from pine wood.

Such oils or distillates are usually more or less acid in character in the primary state and, when applied to foliage in dilute form of sufficient strength to produce satisfactory insecticidal or fungicidal results, may cause injury to the foliage principally because of primary acidity and partly because of further acidity formed subsequent to application by reason of oxidizing activity.

The object of our present invention involves a treatment of such oils to oxidize and neutralize any acid present sufficiently to prevent such foliage injury under ordinary conditions, and yet, when diluted to a sufficient strength, the oils will produce a satisfactory kill of insects and fungi.

The ultimate results of such treatment may be accomplished entirely by chemical reagents, but is also accomplished by first partially saturating the oil with oxygen by bubbling oxygen or air through a volume of oil for a sufficient length of time to develop further acidity to be followed by further treatment to neutralize acidity which is accomplished by treating with alkali. Neutralization may be accomplished by several methods, or with several forms of alkali, but we have found that percolation through calcium carbonate and potassium hydroxide is a satisfactory and economical method of neutralization, but it is not our intention to limit our claims to that particular method.

Such oil that has been neutralized without also first being given an oxidizing treatment can again become more or less acid when exposed in sufficient area to air and/or sunlight, presumably through subsequent absorption of oxygen. Therefore, we have found it preferable to limit such subsequent oxidation and subsequent acidity by partially saturating the oil with oxygen prior to neutralization. Oil so treated is safe to use on foliage under most conditions when applied diluted but in sufficient strength to produce satisfactory kill of insects and/or fungi, for example, one to two gallons in one hundred gallons of spray.

This treated oil may be diluted with water to form the spray by the use of suitable emulsifying agents and applied most satisfactorily to foliage in the form of a spray under pressure.

The effectiveness of such oil may be shown by the fact that dilutions containing only 2 parts oil with 98 parts water and emulsifying materials cause satisfactory kill of insects and harmful fungi.

We have found a very satisfactory emulsifying agent to be rosin size which is primarily a rosin soap produced by treating rosin with boiling alkali carbonate or hydroxide in water solution. The rosin size may contain more or less free rosin.

Another suitable emulsifying agent is a similar size or soap produced by combining suitable fatty animal or vegetable oils with alkali in water solution. We do not, however, limit our claims to the use of these particular methods.

We have found that certain wood oils produced by distillation or extraction are valuable as fungicides, that is, for killing that group of plants known as fungi, some of which are injurious to trees, shrubs and plants. Certain wood oils, particularly from pine wood, as described, contain from 85% to 95% unsaturated hydrocarbons and these oils have been found to be more active as fungicides than the highly refined petroleum oils containing from 85% to 100% saturated hydrocarbons.

In addition to the toxic qualities in themselves claimed for wood distillates or wood oil, such as described, is the fact that certain fractions of such oils are particularly useful and beneficial through their affinity for other toxic chemicals such as nicotine. Nicotine is recognized as a powerful toxic agent in combating various insect pests and is ordinarily used greatly diluted. Nicotine is soluble in water and to a certain extent in certain petroleum oils, but in emulsions of oil and water the nicotine has a greater affinity for water than for the petroleum oil. In insecticides consisting principally of petroleum oil plus nicotine, the desired proportion of nicotine is dissolved in the petroleum oil and that mixture is diluted with water at the time of application, by means of an emulsifying agent. In emulsions so prepared, nicotine shows a greater affinity for water than for petroleum oil, thus causing an almost complete transference of the nicotine from the oil phase of the emulsion to the water phase.

In addition to nicotine, we have also found that copper resinate may be used to good advantage. When such an emulsion is sprayed on foliage the oil and water ordinarily separate, the water evaporating or running off. Therefore, when the nicotine has transferred to the water from the petroleum oil, it cannot remain on the foliage sufficiently long to accomplish its full potential effect.

We have found that when the alkaloid nicotine is first combined in certain wood oil fractions for which it has a greater affinity than for petroleum oil, and this combination is then mixed with petroleum oil and this total combination emulsified with water, the larger part of the nicotine remains in the oil phase of the emulsion and, therefore, being retained in the oil to a greater extent and also retained longer on the foliage, a greatly improved toxic effect is obtained from the nicotine content in addition to the additional toxic effect resulting from the wood oil content.

While we have, for the sake of clearness and in order to disclose our invention so that the same can be readily understood, described it in general terms, we desire to have it understood that this invention is not limited to the specific form disclosed but may be embodied in other ways that will suggest themselves, in view of this broad disclosure, to persons skilled in the art. It is believed that this invention is broadly new and it is desired to claim it as such so that all such changes as come within the scope of the appended claims are to be considered as part of this invention.

Having thus described our invention, what we claim and desire to secure by Letters Patent is—

1. An insecticide and fungicide composition harmless to the plant to be sprayed, said composition consisting of an oil-water emulsion, said oil comprising the product of the process of treating oils of the group consisting of the following members, namely, oils obtained by steam distillation of wood, oils obtained by destructive distillation of wood, and oils obtained by extracting wood with a solvent, each member of said group having the characteristic, after being applied to a plant to be sprayed, of developing acidity harmful to said plant on exposure to the air, said process comprising treating said oil with an oxidizing agent to develop said latent acidity and neutralizing it, whereby an oil results which is soluble in petroleum and safe to spray on plants.

2. An insecticide and fungicide composition harmless to the plant to be sprayed, said composition consisting of an oil-water emulsion, said oil comprising the product of the process of treating oils of the group consisting of the following members, namely, oils obtained by steam distillation of pine wood, oils obtained by destructive distillation of pine wood, and oils obtained by extracting pine wood with a solvent, each member of said group having the characteristic of being soluble in petroleum and, after being applied to a plant to be sprayed, of developing acidity harmful to said plant on exposure to the air, said process comprising treating said oil with an oxidizing agent to develop said latent acidity and neutralizing it, whereby an oil results which is soluble in petroleum and safe to spray on plants.

3. An insecticide and fungicide composition harmless to the plant to be sprayed, said composition consisting of an oil-water emulsion, said oil comprising mineral oil and the product of the process of treating oils of the group consisting of the following members, namely, oils obtained by steam distillation of wood, oils obtained by destructive distillation of wood, and oils obtained by extracting wood with a solvent, each member of said group having the characteristic, after being applied to a plant to be sprayed, of developing acidity harmful to said plant on exposure to the air, said process comprising treating said oil with an oxidizing agent to develop said latent acidity and neutralizing it, whereby an oil results which is soluble in petroleum and safe to spray on plants.

4. An insecticide and fungicide composition harmless to the plant to be sprayed, said composition consisting of an oil-water emulsion, said oil comprising mineral oil and the product of the process of treating oils of the group consisting of the following members, namely, oils obtained by steam distillation of pine wood, oils obtained by destructive distillation of pine wood, and oils obtained by extracting pine wood with a solvent, each member of said group having the characteristic of being soluble in petroleum and, after being applied to a plant to be sprayed, of developing acidity harmful to said plant on exposure to the air, said process comprising treating said oil with an oxidizing agent to develop said latent acidity and neutralizing it, whereby an oil results which is soluble in petroleum and safe to spray on plants.

ELMER R. DE ONG.
EUGENE B. SMITH.